(12) United States Patent
Park (10) Patent No.: US 11,934,040 B2
(45) Date of Patent: Mar. 19, 2024

(54) EYEGLASS FRAME HAVING FOLDABLE BRIDGE

(71) Applicant: Min Gyu Park, Busan (KR)

(72) Inventor: Min Gyu Park, Busan (KR)

( * ) Notice: Subject to any disclaimer, the term of this patent is extended or adjusted under 35 U.S.C. 154(b) by 0 days.

(21) Appl. No.: 18/270,657

(22) PCT Filed: Sep. 28, 2022

(86) PCT No.: PCT/KR2022/014548
§ 371 (c)(1),
(2) Date: Jun. 30, 2023

(87) PCT Pub. No.: WO2023/075180
PCT Pub. Date: May 4, 2023

(65) Prior Publication Data
US 2024/0061269 A1 Feb. 22, 2024

(30) Foreign Application Priority Data
Oct. 29, 2021 (KR) .......................... 10-2021-0147292

(51) Int. Cl.
*G02C 5/08* (2006.01)
(52) U.S. Cl.
CPC ...................................... *G02C 5/08* (2013.01)
(58) Field of Classification Search
CPC .............................................................. G02C 5/08
USPC .......................................................... 351/63
See application file for complete search history.

(56) References Cited

U.S. PATENT DOCUMENTS

| 1,789,937 | A | * | 1/1931 | Curran | G02C 5/006 |
| | | | | | 2/454 |
| 1,925,960 | A | * | 9/1933 | Guilmette | G02C 5/08 |
| | | | | | 351/63 |
| 5,532,766 | A | * | 7/1996 | Mateer | G02C 5/08 |
| | | | | | 351/149 |
| 6,752,496 | B2 | * | 6/2004 | Conner | G02C 5/143 |
| | | | | | 351/63 |
| 9,016,856 | B2 | * | 4/2015 | Chang | G02C 5/146 |
| | | | | | 351/111 |
| 9,405,128 | B2 | * | 8/2016 | Kim | G02C 5/08 |
| 9,671,623 | B2 | * | 6/2017 | Chute | G02C 5/08 |

(Continued)

FOREIGN PATENT DOCUMENTS

| FR | 2572195 | A1 | * | 4/1986 | ............... | G02C 5/08 |
| KR | 200198480 | | | 10/2000 | | |

(Continued)

*Primary Examiner* — Zachary W Wilkes
(74) *Attorney, Agent, or Firm* — IPLA P.A.

(57) ABSTRACT

An eyeglass frame having a foldable bridge includes: a pair of rims facing each other from both sides such that lenses are coupled/configured, respectively; and a bridge configured to be individually separated from the pair of rims, the pair of rims being rotatably connected to inner portions of the bridge, which face each other, such that the pair of rims are unfolded forwards from both sides and then folded rearwards. The bridge includes: a connection plate configured such that inner front surfaces of the pair of rims contact both sides thereof, respectively; and a rotating support coupled to the front of the connection plate such that inner portions of the pair of rims are rotatably coupled to both sides of the connection plate, respectively, front surfaces of the pair of rims being folded.

4 Claims, 5 Drawing Sheets

(56) References Cited

U.S. PATENT DOCUMENTS

| | | | |
|---|---|---|---|
| 10,203,517 B2* | 2/2019 | Greenberg | G02C 5/006 |
| 11,474,374 B1* | 10/2022 | Park | G02C 5/08 |
| 2007/0132938 A1* | 6/2007 | Huang | G02C 5/08 |
| | | | 351/41 |
| 2014/0247421 A1* | 9/2014 | Chang | G02C 5/2254 |
| | | | 351/116 |
| 2016/0033789 A1* | 2/2016 | Klant | G02C 5/006 |
| | | | 351/63 |
| 2018/0017808 A1* | 1/2018 | Greenberg | G02C 5/006 |
| 2022/0091433 A1* | 3/2022 | Ng | G02C 5/006 |

FOREIGN PATENT DOCUMENTS

| | | |
|---|---|---|
| KR | 200270188 | 3/2002 |
| KR | 200296581 | 11/2002 |
| KR | 102093134 | 5/2020 |

\* cited by examiner

EYEGLASS FRAME HAVING FOLDABLE BRIDGE

BACKGROUND

The present invention relates to an eyeglass frame, in which lenses are respectively connected to both sides of the front face and to which a bridge is provided to connect the eyeglass frame in a foldable manner, thereby facilitating easy storage and convenient portability of the eyeglasses.

In general, eyeglasses including lenses and a glass frame refer to lenses worn to correct vision. Such eyeglasses are worn to correct nearsightedness, farsightedness, astigmatism, and other vision problems to approximate normal vision. In typical glasses, a pair of rims to which a pair of lenses are respectively coupled are connected via a bridge. So, since the glasses occupy a significant volume due to long right and left of the front of the eyeglasses even when temples are folded around hinges, and it makes storage and carrying inconvenient. Moreover, a user has to always carry a bulky case to store the eyeglasses, and the front of the eyeglasses may be broken or lenses are separated from the rims by external force when being stored in a bag or the like. Accordingly, many technologies have been developed to fold the front of the eyeglasses, aiming to minimize the volume during storage and transportation.

For a conventional technology that allow the front of the glasses to have a foldable structure, Korean Utility Model Application Publication No. 20-2015-0004634 discloses a structure in which multi-stage glasses temples are folded towards hinges and a glass frame to which lenses are coupled is foldable to rotate upwards around a nose pad (bridge). However, even if rims of the glass frame are rotated upwards from the bridge, since both lenses exist on the same surface, only the space of the bridge is reduced, but the volume occupied by the two lenses remains the same, and, in fact, the volume of the front part may increase due to the space created by the folded multi-stage glasses temples.

Therefore, a foldable structure in which the lenses on both sides overlap each other can minimize the volume of the glasses. Korean Utility Model Registration Nos. 20-0198480, 20-0270188, and 20-0296581 disclose such a foldable structure in which the lenses on both sides overlap each other. As disclosed in the conventional arts, both lens frames are connected to both sides of a connection member (Korean Utility Model Registration No. 20-0198480), a connection piece (Korean Utility Model Registration No. 20-0270188), or a connector (Korean Utility Model Registration No. 20-0296581) by hinges, such that both lenses overlap each other. As described above, in a case in which the rims to which the lenses are coupled at both sides of the bridge, which corresponds the connection member, the connection piece, or the connector, are made to overlap each other by the hinges, namely, by simple pin connection, there are several problems in that the rims to which the lenses are coupled may be arbitrarily folded or unfolded at the bridge after prolonged use due to the loosening of hinged portions, and in that the eyeglasses may be frequently broken and durability of the eyeglasses drops significantly since long-term use may cause shaking of the rims on both sides of the bridge when folded or unfolded.

SUMMARY OF THE INVENTION

Accordingly, the present invention has been made in view of the above-mentioned problems occurring in the related art, and it is an object of the present invention to provide an eyeglass frame having a foldable bridge, in which rims on both sides of the front are designed to be folded around a bridge in such a way that the rims are folded inwardly to be orthogonal to a connection plate of the bridge so as to be easily and accurately unfolded or folded by elasticity of the connection plate, and to maintain the folded state or the unfolded state when both rims are folded or unfolded by elasticity of the connection plate so as to prevent shaking or loosening of connected portions.

It is another object of the present invention to provide an eyeglass frame having a foldable bridge, in which the front of a rotational support which is curved forward from the connection plate protrudes to provide an elegant appearance, which has a simple structure, and in which both rims are folded parallel to each other at a predetermined interval by the connection plate and temples are folded inward between both rims, thereby minimizing the volume.

To accomplish the above-mentioned objects, according to the present invention, there is provided an eyeglass frame having a foldable bridge including: a pair of rims which face each other at both sides and to which lenses are respectively coupled; and a bridge which is configured to be individually separated from the pair of rims, and which is rotatably connected at the inner sides facing each other so that the pair of rims 2 on both sides are unfolded forwards and folded rearwards.

In the present invention, the bridge 3 includes: a connection plate configured such that inner front surfaces of the pair of rims come into contact with both sides thereof, respectively; and a rotating support coupled to the front of the connection plate such that inner portions of the pair of rims are rotatably coupled to both sides of the connection plate, with which the front surfaces of the pair of rims get in contact. The pair of rims further include rotational protrusions 6 configured to protrude inwardly facing each other and respectively connected to both sides of the bridge to be rotatable.

In the present invention, the connection plate includes: coupling holes penetrating front and back; and a support gap formed crosswise vertically between the coupling holes, and the rotational support includes: a supporter 51 protruding forward from the connection plate; support protrusions protruding outward from both sides of the supporter such that a portion of the rear is inserted into the coupling hole; latch hooks which are formed to protrude rearward from both sides of the supporter penetrating the coupling hole front and back and to be bent forward, and of which the front end is spaced apart from the support protrusion such that an opening into which the rotational protrusion is inserted; a rotation space which has a space wider than the opening so that the rotational protrusion inserted into the opening between the support protrusion and the latch hook can be rotated when the rims are folded rearward; and a support groove which is formed at the back of the supporter such that the support gap is inserted and coupled to the support groove.

In the present invention, the rotational protrusion includes: a rotational gap which is formed at the inner end of the rotational protrusion and gets in contact with the rear surface of the connection plate to be inserted into the rotation space through the opening between the support protrusion and the latch hook of the rotational support when both sides of the connection plate are bent forward, thereby rotating inside the rotation space when the rims are folded rearward; and a latch hole which is formed to allow the front end of the latch hook to enter when the rotational gap penetrates back and forth from the outside and the rotational gap enters the rotational space, and to allow the tip of the latch hook to be caught while penetrating through the latch hole when the rims are folded rearward.

According to the specific means for solving the problems, the bridge connected between the rims on both sides to which lenses are respectively coupled is configured to be divided from the rims, and the rotational support is coupled to the front of the connection plate with which both rims are respectively overlapped at both sides, such that the rotational gaps of the rims are inserted into the rotation spaces of the rotational supports protruding rearward from the connection plate so that the rotational gaps are rotated inside the rotation space of the rotational support. Accordingly, when the rims to which the lenses are coupled are unfolded or folded, the eyeglass frame can firmly maintain the unfolded state or the folded state without shaking or loosening by elasticity of both sides of the connection plate coupled to the rotational support, thereby considerably enhancing durability to extend the lifespan.

Furthermore, the eyeglass frame according to the present invention has a simple in which the bridge is formed by the connection between the connection plate and the rotational support, thereby facilitating production, and remarkably reducing manufacturing costs.

Moreover, the eyeglass frame according to the present invention can remarkably reduce the total volume when being folded since the temples are folded inward between the lenses and the rims by the length of the connection plate, thereby facilitating storing of the eyeglasses, making carrying convenient, increase convenience in use, and reducing expenses required for packaging or logistics transport of products.

DETAILED DESCRIPTION OF THE INVENTION

The present invention is to provide an eyeglass frame, in which lenses are respectively connected to both sides of the front face and to which a bridge is provided to connect both frames in a foldable manner, thereby facilitating easy storage and convenient portability of the eyeglasses. The present invention will be described more specifically below along with the drawings.

Figure 1:
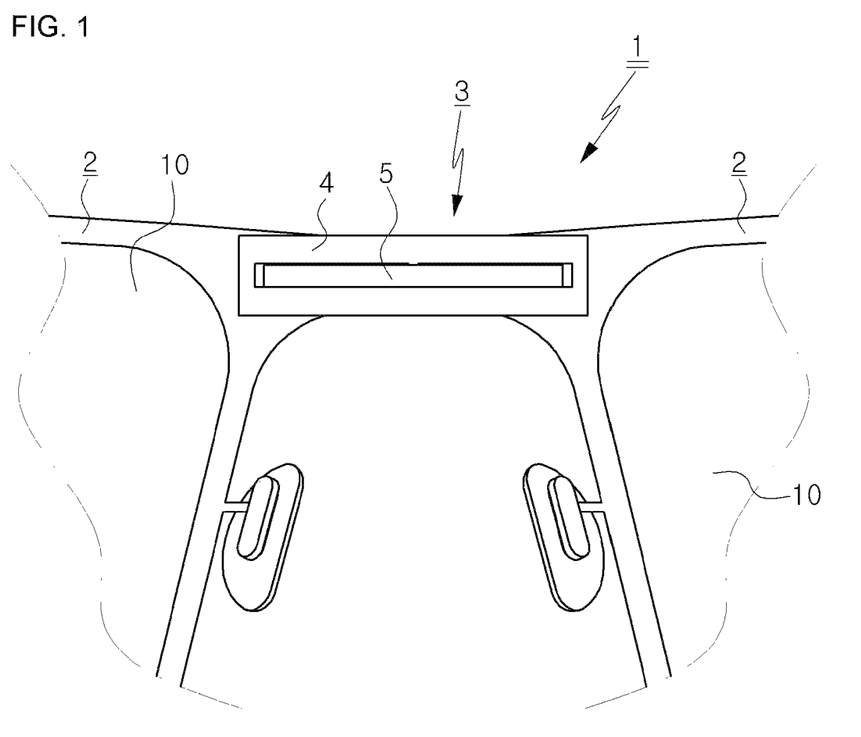
FIG. 1 is a front view showing a preferred embodiment of the present invention.
Figure 2:
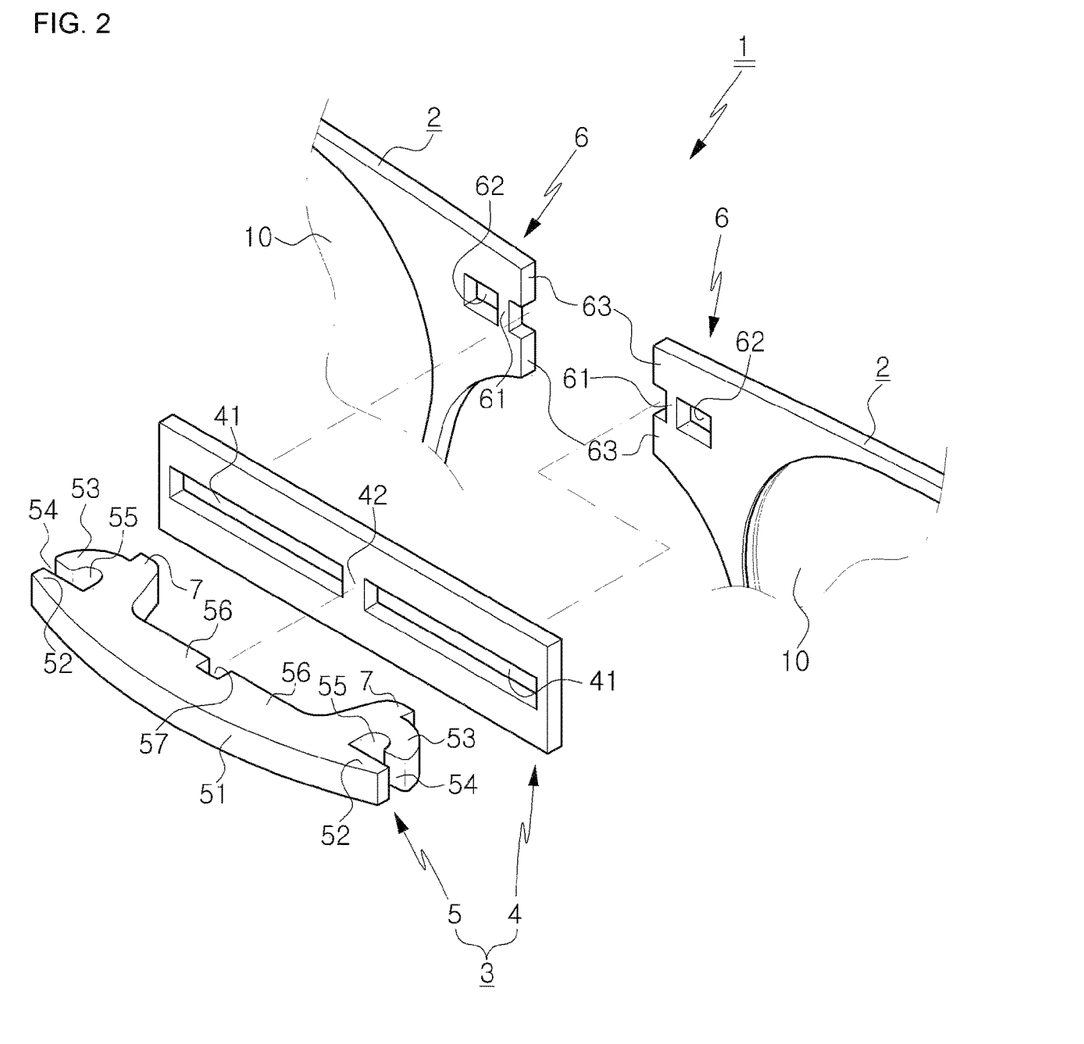
FIG. 2 is an exploded three-dimensional view showing a preferred embodiment of the present invention.

Differently from the conventional eyeglass frame in which rims 2 of both sides are connected integrally to a bridge 3, as illustrated in the front view of FIG. 1 and the three-dimensional view of FIG. 2, an eyeglass frame 1 of the present invention includes: a pair of rims 2, to which lenses 10 facing each other on both sides are coupled; and a bridge 3 which connects the rims 2 and are separately made from both rims 2, such that the rims 2 on both sides can be unfolded forward and folded rearward around the bridge 3.

Figure 3:
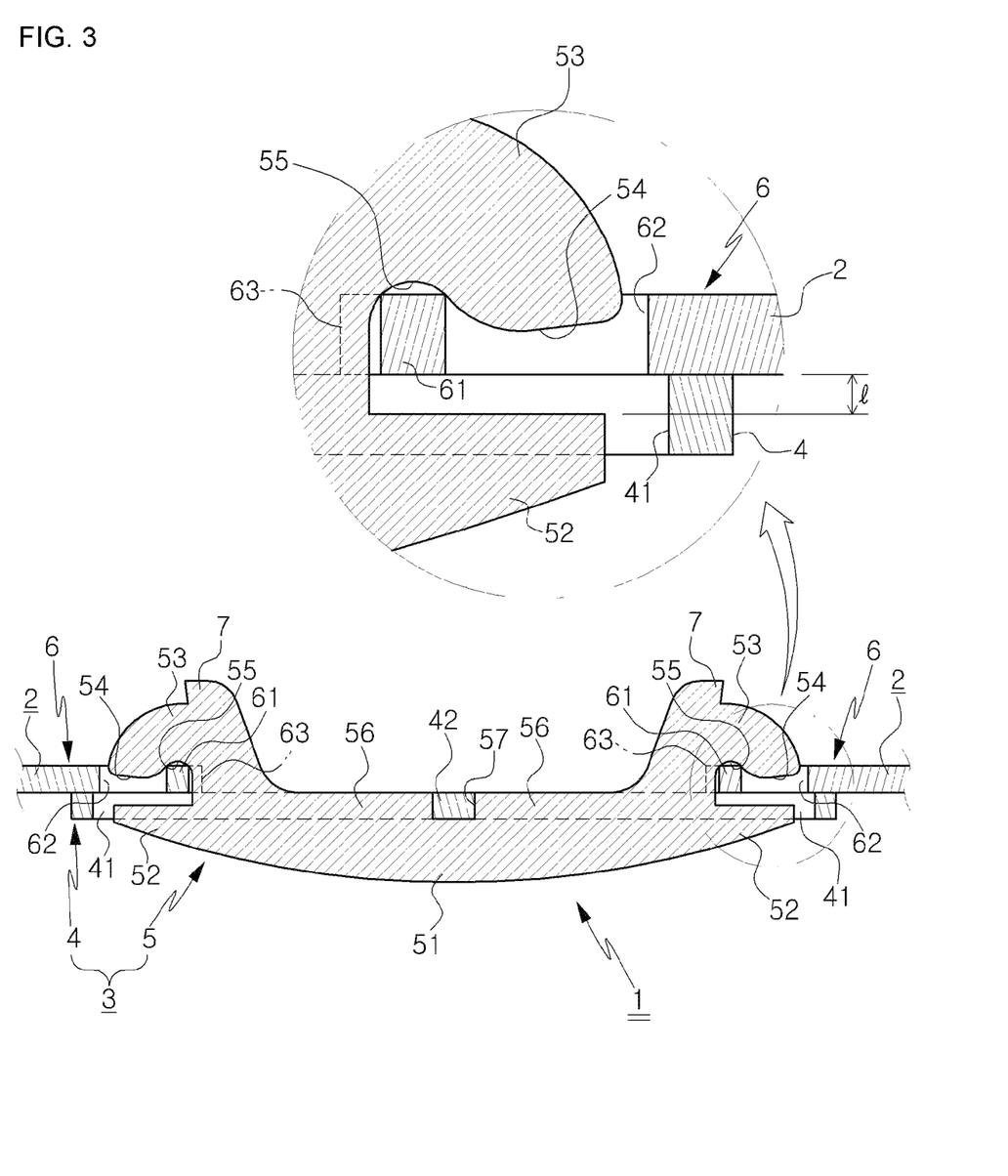
FIG. 3 is a plan cross-sectional view showing a state in which both rims are completely unfolded around a bridge in the present invention.

As illustrated in the three-dimensional view of FIG. 2 and the plan cross-sectional view of FIG. 3, the bridge 3 of the eyeglass frame 1 of the present invention includes: a connection plate 4, which only comes into contact with the rims 2 on both sides; a rotational support 5, which supports the connection plate 4 and is installed to be connected at the front of the connection plate so that rotary protrusions 6 which are respectively formed on the inner surface of the rims 2 to protrude inward is rotated.

In more specifically, as illustrated in FIGS. 1 and 2, the pair of rims 2 face each other on both sides and lenses 10 of eyeglasses are respectively coupled to the rims, and the bridge 3, which connects the pair of rims 2 on both sides, is made separately from the pair of rims 2. In this instance, the rotary protrusions 6 which protrude inward to face each other are connected to rotate so that the pair of rims 2 can be unfolded to face the front and folded to face the back. The above-mentioned rotary protrusions 6 protrude toward the facing inner sides from the pair of rims 2 and are connected in such a way as to come into contact with the connection plate 4 on both sides of the rotating bridge 3 and to be rotatable at both sides of the rotary bridge 3.

As described above, the bridge 3 of the present invention includes a connection plate 4 and a rotational support 5, and the connection plate 4 is configured so that the front surfaces of the rotary protrusions 6 inside the pair of rims 2 come into contact with both sides thereof. The rotational support 5 is combined at the front of the connection plate 4, so that the rotary protrusions 6, which protrude inward from the pair of rims 2 getting in contact with the front of both sides of the connection plate 4, can rotate.

At this time, the connection plate 4 has connection holes 41 which are perforated back and forth in the inner side to allow the rotational support 5 to be connected, and a support gap 42 is formed crossing vertically between the connection holes 41.

The rotational support 5, which is coupled to the connection plate 4, includes a supporter 51 which protrudes forward from the connection plate 4 when coupled to the connection plate 4, and support protrusions 52 and latch hooks 53, each formed to protrude on both sides of the supporter 51 to enable the rotation of the rotary protrusions 6 of both rims 2.

In more detail, as illustrated in FIGS. 2 and 3, the support protrusions 52 protrude outwardly on both sides of the supporter 51 of the rotational support 5, and each of the support protrusions is configured in such a way that a portion of the rear is inserted into the coupling hole 41 of the connection plate 4, or the entire support protrusion 52 is inserted into a portion of the front of the coupling hole 41 of the connection plate 4. The rear surface of these support protrusion 52 does not protrude to the rear of the coupling hole 41 or is not coupled to penetrate to the rear end of the coupling hole 41. As illustrated in the plan cross-sectional view and the enlarged view of FIG. 3, only a portion of the support protrusion 52 is inserted into the coupling hole 41 so that the rear surface of the support protrusion 52 and the rear surface of the connection plate 4 are spaced apart from each other at a predetermined distance M.

As illustrated in FIG. 3, the latch hook 53 is formed in such a way as that the front end protrudes rearward at both sides of the supporter 51 and is curved forward to be inserted and coupled into the coupling hole 41 of the connection plate 4 from the front to the back. In this instance, the front end is spaced apart from the support protrusion 52 so that an opening 54 in which the rotary protrusion 6 is inserted is formed. Accordingly, a rotation space 55 which is a space wider than the opening 54 is formed inside the opening 54 between the support protrusion 52 and the latch hook 53, thereby allowing the rotation of the rotary protrusion 6 inside the opening 54 when the rims 2 are folded rearward.

In addition, a coupling support 56 is formed to protrude rearward of the supporter 51 of the rotational support 5 to be coupled to the coupling hole 41 of the connection plate 4. As illustrated in FIG. 3, the coupling support 56 protrudes further rearward than the support protrusion 52, so that when coupled to the coupling hole 41 of the connection plate 4, the rear end of the coupling support 56 is close to or coincides with the rear end of the coupling hole 41, that is, the rear surface of the connection plate 4. A support groove 57 is formed in the middle of the coupling support 56 to be recessed forward from the coupling support 56 so that the support gap 42 formed crosswise vertically between the coupling holes is inserted and coupled to the support groove 57 when the coupling supports 56 are coupled to the coupling holes 41.

In the present invention, the rotational protrusion 6 of the rim 2 includes: a rotational gap 61 which is formed at the inner end of the rotational protrusion 6 and gets in contact with the rear surface of the connection plate 4 to be inserted into the rotation space 55 through the opening 54 between the support protrusion 52 and the latch hook 53 of the rotational support 5 when both sides of the connection plate 4 are bent forward, thereby rotating inside the rotation space 55 when the rims 2 are folded rearward; and a latch hole 62 which is formed to allow the front end of the latch hook 53 to enter when the rotational gap 61 penetrates back and forth from the outside and the rotational gap 61 enters the rotational space 55, and to allow the tip of the latch hook 53 to be caught while penetrating through the latch hole 62 when the rims 2 are folded rearward.

At this time, the width of the opening 54 between the support protrusion 52 and the latch hook 53 of the rotational support 5 is slightly larger than the thickness of the rotational protrusion 6, and a portion of the support protrusion 52 is inserted forward into the coupling hole 41 to prevent the rotational gap 61 of the rotational protrusion 6 from arbitrarily deviating from the rotational space 55 through the opening 54. Along with the above, a pair of pressure protrusions 63 protruding inward in the vertical direction are formed at the front end of the rotational gap 61. So, as illustrated in FIG. 3, the latch hook 53 of the rotational support 5 is placed between a pair of the pressure protrusions 63 when the rims 2 are unfolded, thereby firmly combining the rim 2 and the bridge 3, and firmly maintaining the folded state by pressing forward both ends of the connection plate 4 on the support gap 42 when the rims 2 are folded rearward as illustrated in FIG. 5.

In addition, a rotational stopper 7 is formed to protrude rearward from the bent latch hook 53 on both sides of the rotating support 5. When the rotational gap 61 of the rotational protrusion 6 enters the rotating space 55 of the rotating support 5 and the latch hook 53 of the rotating support 5 enters the latch hole 62 of the rotational protrusion 6, the rotational stopper 7 limits a rotational angle that the rims 2 are folded rearward by catching the edge of the latch hole 62 when the rims 2 coupled to both sides of the bridge 3 to which the rotational support 5 and the connection plate 4 are coupled are folded rearward.

Figure 4:
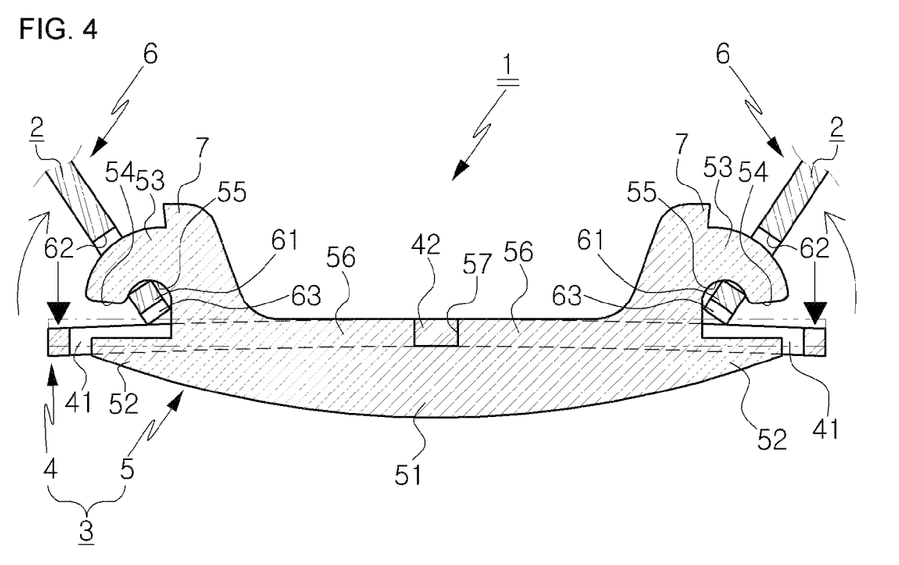
FIG. 4 is a plan cross-sectional view showing a state in which both rims are partially folded around the bridge in the present invention.
Figure 5:
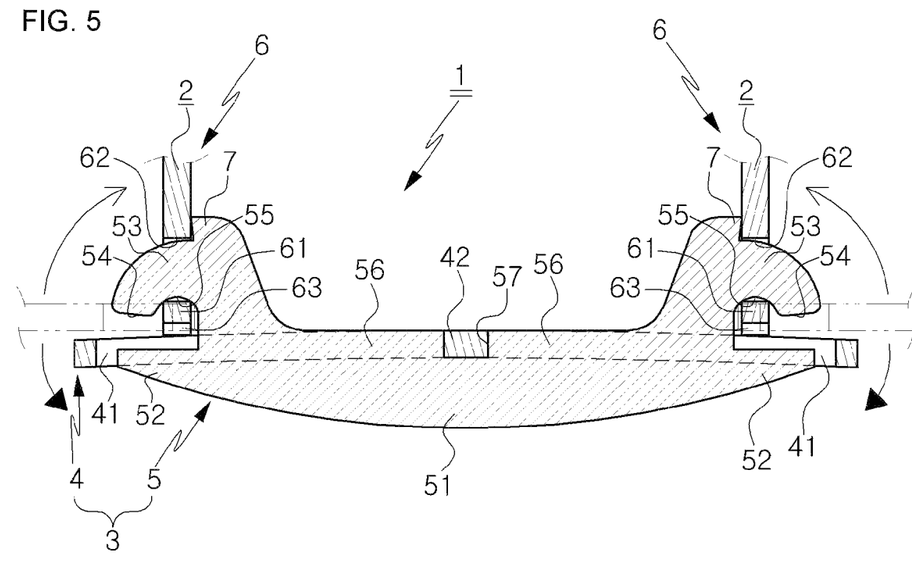
FIG. 5 is a plan cross-sectional view showing a state in which both rims are completely folded around the bridge in the present invention.
Figure 6:
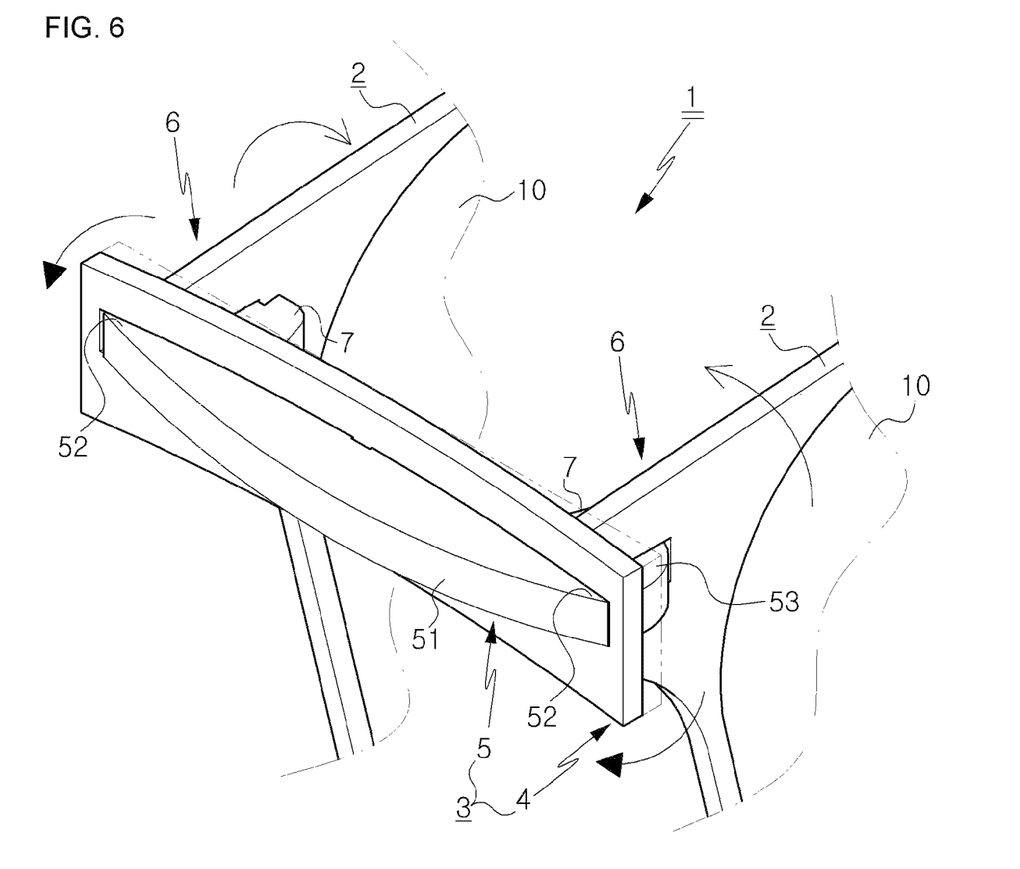
FIG. 6 is a three-dimensional view showing the state of FIG. 5.

As illustrated in FIG. 3, the eyeglass frame 1 having the foldable bridge 3 according to the present invention allows a user to wear the eyeglasses by unfolding the rims 2, which are connected to both sides to be rotatable around the bridge 3, forwardly flatways, and allows the rims 2 to be completely folded rearward as illustrated in FIGS. 5 and 6 when the user folds the rims 2 rearward around the bridge 3 as illustrated in FIG. 4 when not using the eyeglasses, thereby minimizing the volume of the eyeglasses since the lenses 10 are folded to face each other, allowing easy storage, and making carrying easy.

when the rims 2 to which the lenses 10 are coupled are folded slowly from the unfolded state of FIG. 3 to the folded state of FIG. 4, the rotational gaps 61 of the rotational protrusions 6 of the rims 2 rotate in the rotation spaces 55 formed inside between the front support protrusion 52 and the latch hook 53 on both sides of the rotational support 5 of the bridge 3, and the both sides of the connection plate 4 are bent forward around the support gap 42 inserted into the support groove 57 in the middle of the rotational support 5 by the pressure protrusion 63 protruding more than the rotational gap 61 at the top and bottom of the front end. As illustrated in FIGS. 5 and 6, when the rims 2 to which the lenses 10 of both sides are coupled are fully folded rearward, the sides maintains the folded state of the rims 2 and prevent the rims from being unfolded by elasticity of the connection plate 4.

At this time, as illustrated in FIG. 5, the rims 2 fold rearward along the latch hook 53 on both sides of the rotational support 5 of the bridge 3 penetrated in the latch hole 62 of the rotational protrusion 6, and the rotational action of the rims 2 is limited by the rotational stopper 7 protruding rearward from the latch hook 53, thus stopping the rotational action. Accordingly, the present invention allows the rims 2 to which the lenses 10 are coupled on both sides around the bridge 3 to be accurately folded at the same angle, and preventing deformation or damage of the eyeglass frame 1 in the folded state.

On the contrary, if the user wants to use the eyeglasses, when the user rotates the rearwardly folded rims 2 forward, the rims gradually spread from the folded state of FIGS. 5 and 6 to the state of FIG. 4, and then, when the rim 2 are rotated outwardly and forwardly at 45° or more from the completely rearwardly folded position, the rims 2 on both sides are automatically spread fully forward as illustrated in FIG. 3 by elastically restoring force of the connection plate 4 of which both sides are bent forward, thereby improving convenience in use.

According to the present invention, when the rims 2 to which the lenses 10 are coupled are unfolded or folded, the eyeglass frame can firmly maintain the unfolded state or the folded state without shaking or loosening by elasticity of both sides of the connection plate 4 coupled to the rotational support 5, thereby considerably enhancing durability, making manufacturing easy due to a simple structure, and remarkably reducing manufacturing costs. In addition, the eyeglass frame according to the present invention can considerably reduce the total volume when being folded since the temples can be folded inwardly between the lenses 10 and the rims 2 by the length of the bridge 3 having the connection plate 4 and the rotational support 5, thereby making storage and carrying easy and convenient, and considerably reducing expenses required for packaging or transportation of logistics.

As described above, while the most desirable embodiments of the present invention are described, it will be understood by those of ordinary skill in the art that various changes and modifications may be made therein without departing from the technical idea and scope of the present invention. Therefore, the scope of the disclosed contents should not be limited to the described embodiments, but should be determined by the appended claims and equivalents thereof.

According to the eyeglass frame having the foldable bridge provided in the present invention, the bridge which connects both frames is formed to be foldable, but has excellent durability since not being shaken or loosened when being folded or unfolded by elasticity. Therefore, the present invention can stimulate a lot of purchasing desire among consumers who value portability, thus having high industrial applicability.

The invention claimed is:

1. An eyeglass frame having foldable bridge comprising:
   a pair of rims (2) which face each other and to which lenses (10) are respectively coupled; and
   a bridge (3) which is configured to be individually separated from the pair of rims (2), and which is rotatably connected at inner sides facing each other so that the pair of rims (2) are unfolded forwards and folded rearwards,
   wherein the bridge (3) comprises:
   a connection plate (4) configured such that inner front surfaces of the pair of rims (2) come into contact with both sides thereof, respectively;
   and a rotating support (5) coupled to a front of the connection plate (4) such that inner portions of the pair of rims (2) are rotatably coupled to sides of the connection plate (4), with which front surfaces of the pair of rims (2) get in contact, and
   wherein the connection plate (4) comprises:
   coupling holes (41) penetrating front and back; and
   a support gap (42) formed crosswise vertically between the coupling holes (41), and
   wherein the rotational support (5) comprises:
   a supporter (51) protruding forward from the connection plate (4);
   support protrusions (52) protruding outward from sides of the supporter (51) such that a portion of a rear of each support protrusion (52) is inserted into the coupling holes (41);
   latch hooks (53) which are formed to protrude rearward from both sides of the supporter (51) penetrating the coupling holes (41) front and back and to be bent forward, and of which a front end of each latch hook (53) is spaced apart from each support protrusion (52) such that an opening (54) into which a rotational protrusion (6) is inserted;
   a rotation space (55) which has a space wider than the opening (54) so that the rotational protrusion (6) inserted into the opening (54) between the support protrusion (52) and the latch hooks (53) can be rotated when the rims (2) are folded rearward; and
   a support groove (57) which is formed at aback of the supporter (51) such that the support gap (42) is inserted and coupled to the support groove.

2. The eyeglass frame according to claim 1, wherein the pair of rims (2) further include rotational protrusions (6) configured to protrude inwardly facing each other and respectively connected to both sides of the bridge (3) to be rotatable.

3. The eyeglass frame according to claim 1, wherein the rotational protrusion (6) includes:
   a rotational gap (61) which is formed at the inner end of the rotational protrusion (6) and gets in contact with the rear surface of the connection plate (4) to be inserted into the rotation space (55) through the opening (54) between the support protrusion (52) and the latch hook (53) of the rotational support (5) when both sides of the connection plate (4) are bent forward, thereby rotating inside the rotation space (55) when the rims (2) are folded rearward; and
   a latch hole (62) which is formed to allow the front end of the latch hook (53) to enter when the rotational gap (61) penetrates back and forth from the outside and the rotational gap (61) enters the rotational space (55), and to allow the tip of the latch hook (53) to be caught while penetrating through the latch hole (62) when the rims (2) are folded rearward.

4. The eyeglass frame according to claim 3, further comprising:
   a rotation stopper (7) which protrudes rearward from the bent hook (53), and which is configured to limit a rotational angle that the rims (2) are folded rearward by catching an edge of the latch hole (62) when the rims (2) coupled to both sides of the bridge (3) to which the rotational support (5) and the connection plate (4) are coupled are folded rearward.

* * * * *